(12) United States Patent
Flenche

(10) Patent No.: US 9,068,635 B2
(45) Date of Patent: Jun. 30, 2015

(54) DESMODRONIC SHAFT AND YOKE ASSEMBLY FOR TRANSLATING LINEAR TO ROTARY MOTION

(75) Inventor: George Flenche, Elizabeth Downs (AU)

(73) Assignee: Exodus R&D International PTE LTD, Singapore (SG)

( * ) Notice: Subject to any disclaimer, the term of this patent is extended or adjusted under 35 U.S.C. 154(b) by 56 days.

(21) Appl. No.: 13/452,898

(22) Filed: Apr. 22, 2012

(65) Prior Publication Data

US 2013/0000594 A1    Jan. 3, 2013

(30) Foreign Application Priority Data

Jun. 30, 2011    (AU) ................. 2001902573

(51) Int. Cl.
| F01B 9/00 | (2006.01) |
| F16H 21/30 | (2006.01) |
| F01B 9/06 | (2006.01) |
| F01B 9/02 | (2006.01) |
| F02B 75/32 | (2006.01) |

(52) U.S. Cl.
CPC .............. *F16H 21/30* (2013.01); *Y10T 74/1828* (2015.01); *F01B 9/06* (2013.01); *F01B 9/023* (2013.01); *F01B 9/00* (2013.01); *F02B 75/32* (2013.01)

(58) Field of Classification Search
CPC .......... F02B 75/32; F02B 41/04; F01B 9/047; F01B 9/00; F01B 9/02; F01B 9/023; F01B 9/04; F01B 9/06; F16H 25/16; F16H 25/06; F16H 25/04; F16H 21/36; F16H 21/18
USPC ........ 123/197.1, 197.3, 197.4; 74/49, 50, 53, 74/55, 56
See application file for complete search history.

(56) References Cited

U.S. PATENT DOCUMENTS

| 2,513,514 | A | * | 7/1950 | Poage ............................... 74/50 |
| 4,459,945 | A | * | 7/1984 | Chatfield ..................... 123/55.3 |
| 4,791,898 | A | | 12/1988 | Jayne |
| 2005/0235764 | A1 | * | 10/2005 | Johnson ........................... 74/55 |

FOREIGN PATENT DOCUMENTS

| GB | 152799 A | 10/1920 |
| GB | 200704 A | 7/1923 |

* cited by examiner

*Primary Examiner* — Lindsay Low
*Assistant Examiner* — Jacob Amick
(74) *Attorney, Agent, or Firm* — Weiner & Burt, P.C.; Irving M. Weiner; Pamela S. Burt

(57) ABSTRACT

The present invention relates to an assembly for translating linear movement to rotary motion, and in particular to an improved relationship between a linearly reciprocal member such as a yoke structure and associated piston, and a rotatable shaft such as a crank shaft. The invention could be used in any application where motion is to be translated from rotary to linear or vice versa, such as in compressors for example.

18 Claims, 10 Drawing Sheets

DESMODRONIC SHAFT AND YOKE ASSEMBLY FOR TRANSLATING LINEAR TO ROTARY MOTION

CROSS-REFERENCE TO RELATED APPLICATIONS

This application claims the benefit of an Australian provisional application number 2011902573, filed Jun. 30, 2011. The entire disclosure of the prior application is hereby incorporated by reference.

FIELD OF THE INVENTION

The present invention relates to an assembly for translating linear movement to rotary motion, and in particular to an improved relationship between a linearly reciprocal member such as a yoke structure and associated piston, and a rotatable shaft such as a crank shaft. The invention could be used in any application where motion is to be translated from rotary to linear or vice versa, such as in compressors for example.

BACKGROUND OF THE INVENTION

The internal combustion engine has now been with us for many decades and has become a most familiar design wherein the reciprocating piston uses connecting rods to connect the piston to the crank pins of the crank shaft to translate linear reciprocating motion of the pistons to rotary motion of the crank shaft.

For the most part, a connecting rod is articulable at both ends where it attaches to the piston and crank pin. This piston is connected to the connecting rod by a wrist pin that passes through the piston and the connecting rod. For the most part, these kinds of designs for such internal combustion engines are known as slider crank engines. Nonetheless, time has proven that these types of internal combustion engines do have significant disadvantages and limitations.

There has been a push, particularly now that fossil fuels are becoming scarce and there is a greater community emphasis to protect the environment by way of exhaust coming from conventional internal combustion energy, to improve upon the conventional slider crank engine.

The Scotch yoke has been used in certain engine designs seeking to utilize cyclic dynamics over the slider crank engines. For the most part, traditional Scotch yoke engines connect two horizontally opposed pistons by non-articulable connecting rods to a shuttle having a slot which accommodates the crank pin of a crank shaft. Guide services constrain the motion of the shuttle to a linear path and the crank pin slides within the slot as the crank shaft rotates through its range, converting the linear reciprocating piston movement to rotary crank shaft motion.

As the person skilled in the art will realise, the slot within the shuttle must be at least as wide as the crank pin diameter and at least as long as the diameter of the crank pin travel. Further, as the piston rod is part of a piston plate or the like which is restricted to linear reciprocated motion, any movement of the crank shaft will automatically see the piston extended or retracted away from any settable momentary position, including the sparking position.

A present trend in engine design is to increase engine rpm using the conventional piston rod with a Scotch yoke structure. The use of convention scotch yokes is not always possible for the most part as the piston stroke is short and the time available for drawing air into the combustion chamber is very short. This causes combustion at less than the ideal 15 to 1 air/fuel ratio for the fuel which in turn, leaves unburnt fuel to be exhausted as pollutants into the atmosphere. With the exhausted unburnt fuel goes wasted energy which should have been converted to power to drive the piston.

What effectively is happening in both currently available slider crank engines as well as Scotch yoke based designs is that there is inefficient coupling between the piston rod and the crank shaft. In con-rod engines, a greater torque can be achieved at specific crank angles by increasing the length of the stroke, that is, the height of the connecting rod and thus the height of the engine. This however is not practical in many applications and there are various associated disadvantages.

The skilled addressee would realise that a Scotch yoke transmits its force to a centre line location of a crank pin (a conventional crank) at a 90° crank angle for its maximum torque. Therefore, the linear travel of a Scotch yoke is always consistent, whether or not it has been modified for dwell, and its maximum leverage is always at 90°. The crank shaft typically has a sliding/rolling element associated therewith that slides/rolls on the yoke for the entire 360 degree rotation of the crank shaft. Scotch yokes therefore have very limited application.

The present inventor has recognised the need for an improved means of translating linear to rotary motion, and vice versa, and in combustion engine applications an improved relationship between yoke and crank, and yoke and piston, ensuring that torque is maximised at a much greater force than for example a scotch yoke.

International Patent Application No. PCT/AU2011/000398, owned by the present Applicant and incorporated by reference herein, provides an example of a cam yoke type engagement which overcomes some of the aforementioned problems by providing a mode of operation that is interchangeable between a crank mode and a cam mode in one revolution of the crank shaft to achieve increased leverage (pressure transferred to a greater leverage point) and a piston dwell time for improved combustion. That invention involved the use of a bearing or wheel member rotatable about an end of a crank arm associated with the crank shaft, and engageable with an inner surface of a linearly moveable yoke structure with which a piston is associated. The inner surface includes a shoulder portion which serves to momentarily interrupt the transformation of linear motion of the piston into rotary motion of the crank, the bearing thus undergoing a function change from a crank mode to a cam mode.

The Applicant's prior international application thus proposes an assembly which improves combustion and introduces a leverage effect to increase maximum torque at a much greater force than a conventional scotch yoke. However, while the Applicant's own prior art serves its purpose and provides a unique advantage over conventional assemblies of this type, the present invention seeks to provide a further improved assembly by addressing issues such as, but limited to the following:

leverage not being fully maximised;
combustion and energy efficiency not being optimum;
component design and configuration being such that the assembly involves a large number of parts and does not lend itself to simplified manufacturing;
component design and configuration being such that the assembly is not easily adjustable for leverage/dwell to suit different applications; and
vibration/rattle issues resulting from the use of multiple components and by significant load bearing against a single rolling element.

It is therefore an object of the present invention to overcome at least some of the aforementioned problems or to provide the public with a useful alternative.

It is to be understood at the outset that any reference to a "cam effect" herein should not to be interpreted as being the same phenomenon as the earlier mentioned "cam mode" of the bearing in the Applicant's prior art patent application.

Further objects and advantages of this invention will become apparent from a complete reading of the following specification.

SUMMARY OF THE INVENTION

The present invention relates to an improved relationship between a rotatable shaft and a linearly reciprocal member such that the linear motion of the shaft results in maximum energy being transferred to the shaft for rotation thereof. While the invention embodied herein relates to internal combustion engines, it is to be understood that the invention could equally well be applied to any application involving the translation of linear to rotary motion or vice versa.

It should become apparent from a reading of this specification that the assembly provides for greater leverage than either scotch yoke or con-rod engine types in that the interaction between crank and piston is, in part, cam-related. The present invention provides a linear movement mechanism that is rigid, meaning the piston movement is linear and integral with the movement of the yoke structure, and which is able to transform energy to a greater leverage point than conventional engines at the same stroke length. As a result, a leverage effect is established and pressure transferred to the crank is maximised.

Accordingly, in one form of the invention, although this need not be the only nor indeed the broadest form of the invention, there is provided an assembly for translating linear motion of a linearly moveable member between a top dead centre and a bottom dead centre position to rotary motion of a rotatable shaft that is rotatable about a first axis, said assembly characterised by:

a yoke structure associated with said linearly moveable member and moveable therewith, said yoke structure including at least one inner arced surface having a radius defined by a second axis that extends parallel to the first axis but is disposed therefrom; and a leverage means associated and rotatable with the rotatable shaft about said first axis, whereby an outer peripheral edge of said leverage means includes at least one arced contact surface having a radius defined by a third axis extending parallel to each of said first and second axes, said leverage means including a centre line extending through each of said first and third axes;

wherein the leverage means and the yoke structure are dimensioned such that the inner arced surface of the yoke structure is encountered by the arced contact surface of the leverage means during a downstroke of the linearly moveable member from an approximate 90 degree shaft rotation angle;

wherein from the commencement of each shaft revolution to the approximate 90 degree shaft rotation angle, contact between the leverage means and the yoke structure occurs at a first contact point which is disposed along said centre line; and wherein contact between the respective arced surfaces occurs at a second contact point along said leverage means arced contact surface that is circumferentially disposed from said first contact point.

It is the rocking motion or "cam effect" which takes place between 90 and 180 degree shaft rotation, as opposed to sliding or rolling, between the two components through a particular range of angles which distinguishes the assembly from conventional scotch yoke type assemblies and which results in an improved interaction between these components and a much greater torque range.

Thus, the assembly of the invention incorporates a rotatable shaft that is engageable with an inner surface of a yoke structure, the shaft including what is referred to herein as a leverage means including an outer peripheral edge adapted to contact the inner surface of a yoke structure along an arced surfaces associated with the leverage means at any one time throughout the rotation of the shaft. The components are dimensioned such that during at least a range of angles, there is a "rocking motion" interaction between an arced surface of the leverage means and the inner surface of the yoke (analogous to the motion of a rocking horse rocking with the floor) which importantly causes a constant contact force to be transferred from the yoke structure to the shaft. This effect is referred to herein as a "cam effect".

In one form of the invention, the leverage means includes what is referred to herein is a "cam follower member" and an associated larger rolling element, including an arced surface adapted to contact an inner arced surface of the yoke structure, such interaction causing said "cam effect" during at least a range of shaft rotation angles.

In a further form of the invention, the leverage means includes a "cam follower member" having an outer peripheral edge adapted to contact an inner surface of the yoke structure along an arced surfaces of the cam follower member at substantially all times throughout the shaft rotation, such interaction causing said "cam effect" during at least a range of shaft rotation angles.

Preferably the cam follower member and yoke structure inner surface are dimensioned such that said "cam effect" occurs between at least 90 and 180 degree rotation of the shaft.

In preference the cam follower member and yoke structure inner surface are dimensioned such that the shaft rotates between 0 and 90 degrees without any such rotary movement being translated on rectilinear motion of the yoke structure. Thus, when applied to a combustion engine, the present invention improves combustion efficiency by also introducing a dwell time at top dead centre.

In preference the cam follower member and yoke structure inner surface are dimensioned such that the shaft rotates between 180 and 270 degrees without any such rotary movement being translated on rectilinear motion of the yoke structure. Thus, when applied to a combustion engine, the present invention improves combustion efficiency by also introducing a dwell time at bottom dead centre.

In an embodiment, the arced surface of the outer peripheral edge of the leverage means includes at least a semi-circular circumference, and the inner arced surface of the leverage means includes at least a quarter circle circumference, and said first and second axes are disposed such that contact there between occurs during said downstroke between 90 and 180 degree shaft rotation. Further, said first axis may be disposed along a base centreline of said semicircular edge. Still further, said cam follower member may include at least a second arced contact surface and said yoke structure inner surface includes at least one linear surface, wherein said second arced contact surface is adapted to contact said linear surface to thereby provide at least a second contact point. In addition, said at least second arced contact surface may be a quarter circle edge whose central axis is also disposed along said base centre line of said semicircular edge. In an embodiment, said cam follower member includes at least a third arced contact surface in the form of a second quarter circle edge whose central axis is also disposed along said base centre line of said semicircular edge, wherein said first axis is disposed between the central axis of each quarter circle edge. Further, said quarter circle edges may be adjacent and flush with a linear edge extending between the quarter circle edges.

The assembly is adjustable for leverage by adjusting, by an equal percentage, the radius of each of the quarter and semicircles associated with the cam follower member. Furthermore, the stroke of the linearly moveable member is also adjustable by adjusting the distance between the shaft centre point and the centre point of the distal quarter circle.

In a still further preferred form of the invention, the shaft is a desmodronic shaft and each of said first and second quarter circle edges are adjacent and flush with said semi-circular edge, wherein at least a portion of the second quarter circle edge, the semi-circular edge at a portion adjacent the second quarter circle edge, or both, is sawn off to expose a rolling element housed substantially inside the cam follower member such that only a partial circumference of the rolling element extends out from the cam follower member footprint, a central axis of the rolling element being disposed along a base centre line of said semicircular edge. The rolling element contacts said yoke structure inner surface during said "cam effect", the rolling element being of equal radius to said arced surface, said arced surface including a sawn off tip to allow for said rolling element to contact said yoke structure when said tip would otherwise have made contact with said inner surface. The use of an anti-friction or rolling element is particularly important between 90 and 180 degree rotation of the shaft to reduce chatter that would otherwise occur between the contacting surfaces.

The constant contact "cam effect" thus transfers the piston force from the yoke structure to the crank shaft without "sliding" as per conventional scotch yokes but in a rocking motion through a range of angles of rotation between 90 and 180 degrees. This allows a much greater torque range than any conventional/scotch yoke designed engine. In using a cam follower member and yoke structure embodied herein, both the leverage and dwell aspects of the invention can be varied to suit a manufacturer's requirements as will become apparent.

The present invention is an improvement on the assembly disclosed in the international application mentioned in the preamble in that the means of interaction, referred to herein as the leverage means, includes or comprises of a cam follower member which interacts along its perimeter with an inner surface of the yoke structure. It will become apparent that an assembly incorporating such a leverage means addresses at least some of the problems identified in the preamble of the invention.

Preferably the assembly is an internal combustion engine, wherein said linearly moveable member is a yoke assembly having at least one piston associated therewith, and said rotatable shaft is a crank shaft. Advantageously, said shaft is a desmodronic crank shaft.

BRIEF DESCRIPTION OF THE DRAWING FIGURES

The accompanying drawings, which are incorporated in and constitute a part of this specification, illustrate several implementations of the invention and, together with the description, serve to explain the advantages and principles of the invention. In the drawings.

DETAILED DESCRIPTION OF THE PREFERRED EMBODIMENTS

Figure 1:
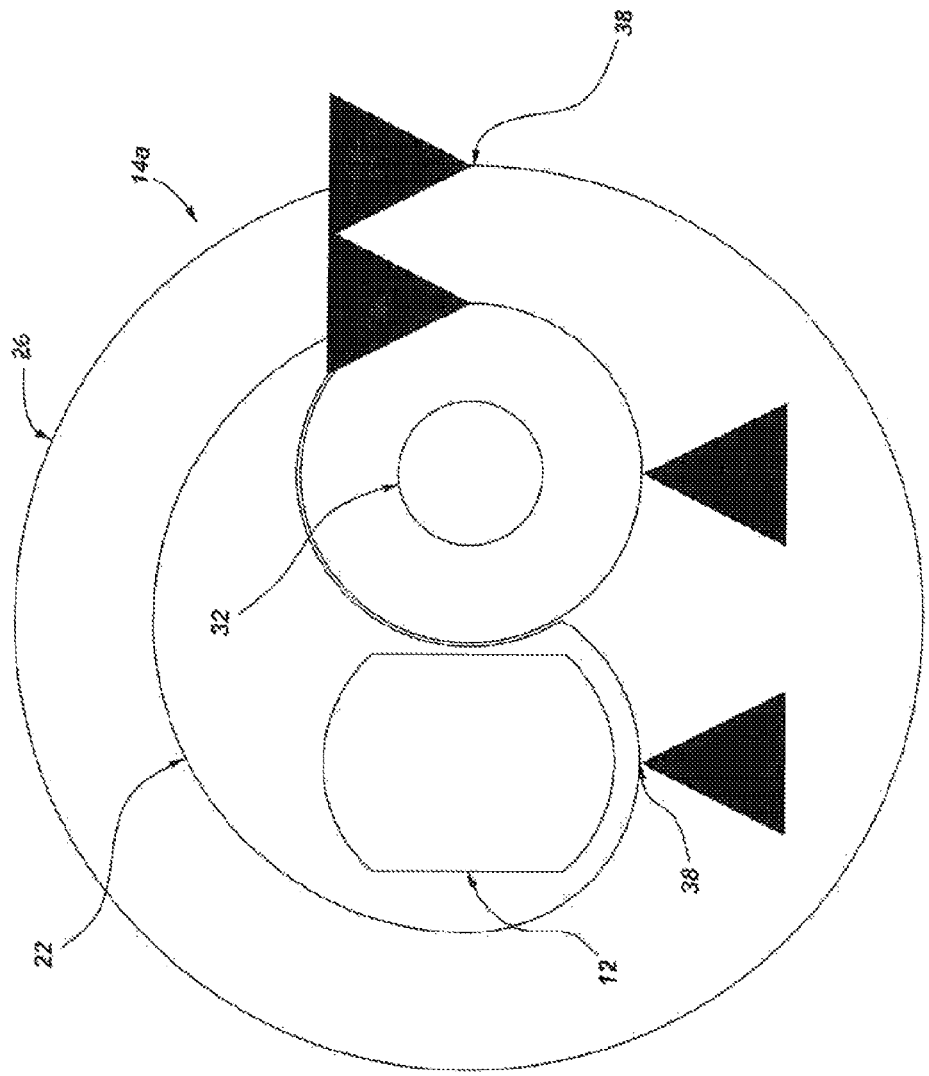
FIG. 1 illustrates an end profile view of a crank assembly including a leverage means built into the crank shaft in accordance with a first embodiment of the present invention.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the embodiments and the following description to refer to the same and like parts.

The present invention relates to an assembly 10, which may form part of an internal combustion engine (not shown), including a crank shaft 12, a leverage means 14 associated with or built into the crank shaft, and at least one linear yoke assembly 16 including a yoke structure 18 with which the leverage means interacts to translate the linear motion of a piston 20, for example, associated with the yoke structure to rotary motion of the crank or, in broad terms, shaft 12.

Figure 2:
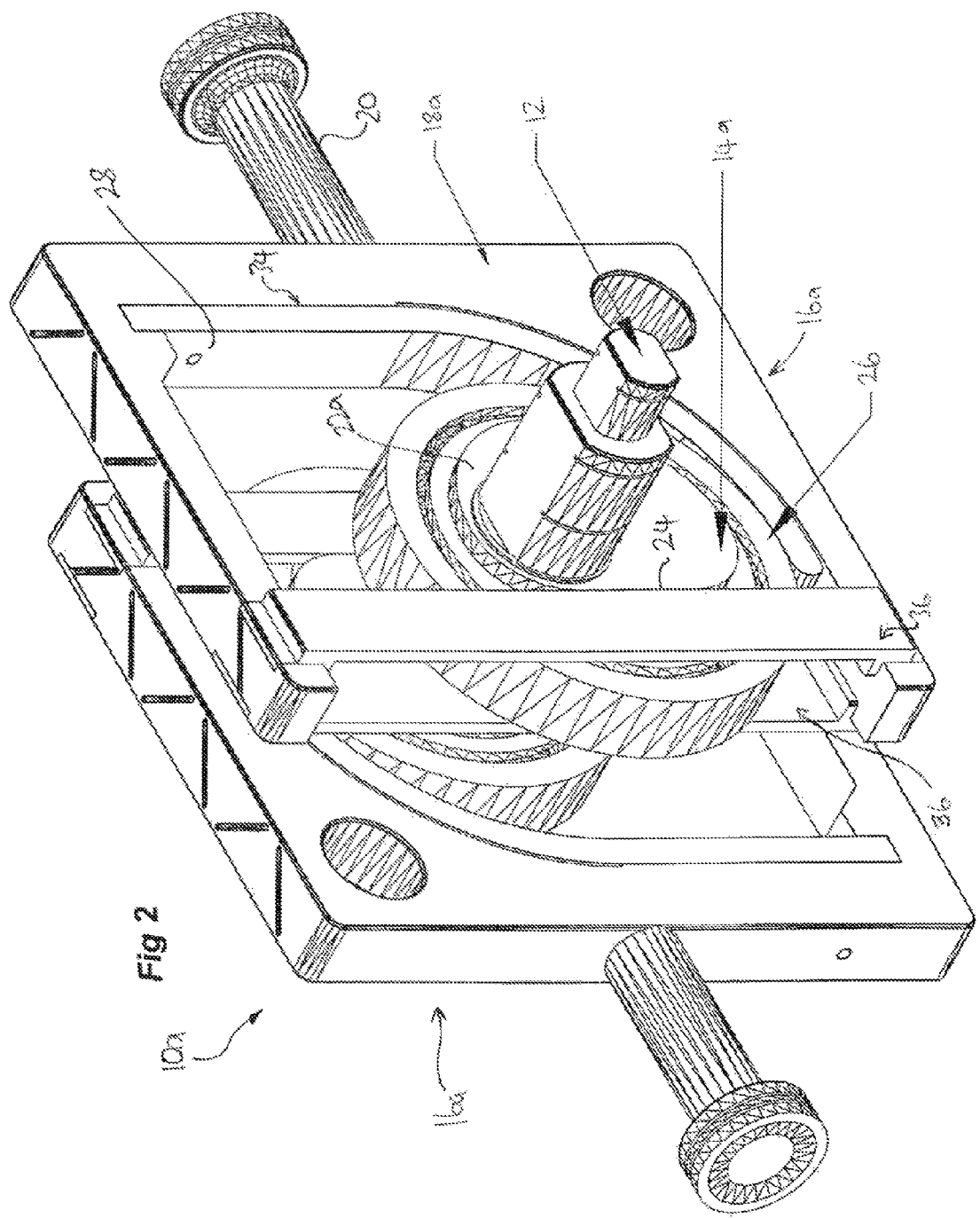
FIG. 2 illustrates a perspective view of a linear yoke assembly including a crank assembly incorporating the leverage means of FIG. 1 with two single piston yoke structures.

It will be appreciated from a viewing of FIG. 2, for example, that the present invention can be used as a translatory assembly in an internal combustion engine. The leverage means 14 and linear yoke assembly 16 act to efficiently translate rectilinear motion of the moving piston to a rotary motion up against the crank shaft 12 when applied to an internal combustion engine environment. Although not shown, guide members may be included to assist the linear sliding motion of the piston yoke. In a preferred embodiment, the pistons are configured to be frictionless in that they do not contact the sides of the cylinder.

Figure 3:
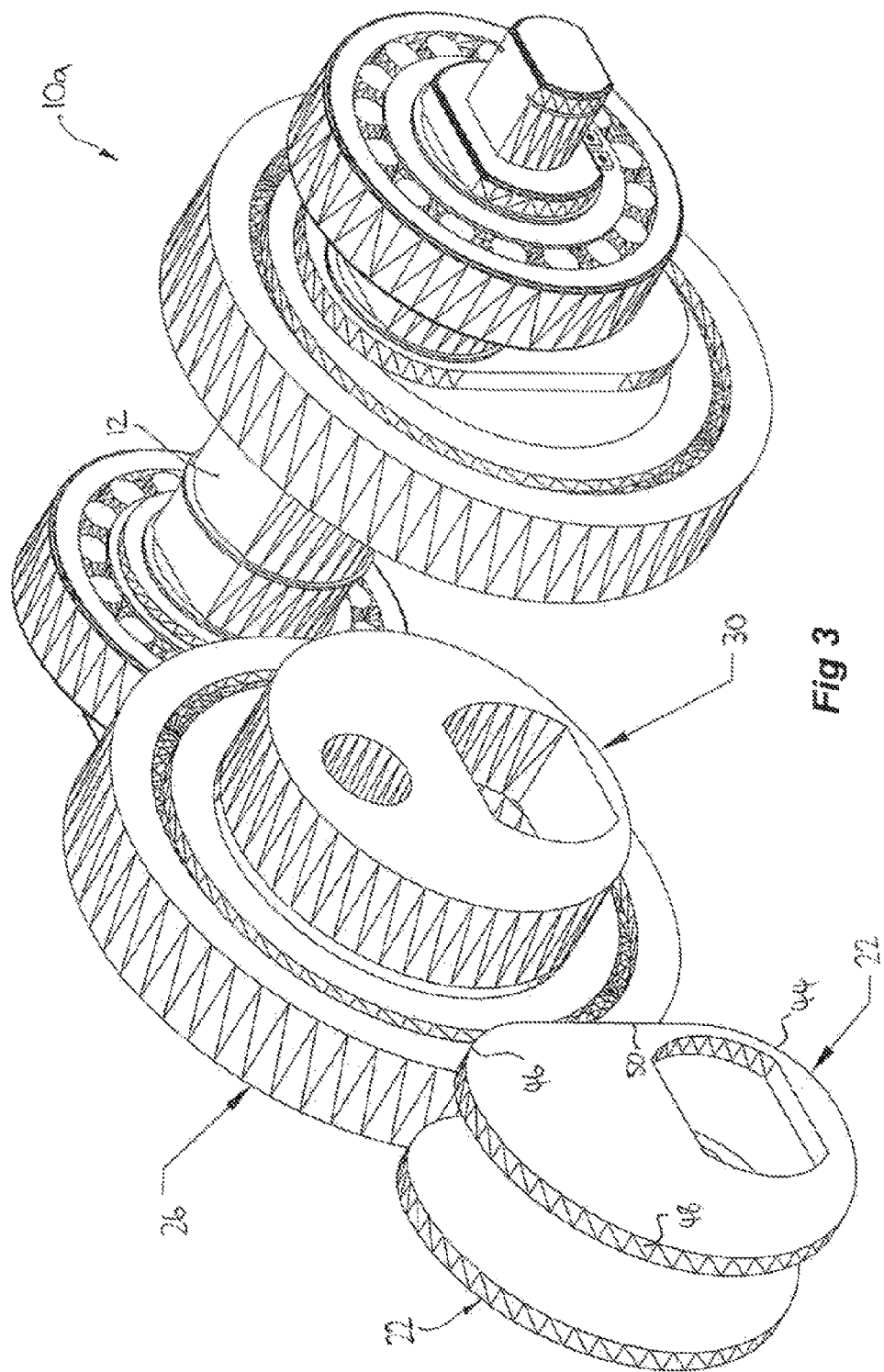
FIG. 3 illustrates a partially exploded view of FIG. 2.

The assembly shown in FIGS. 2 and 3 demonstrates how two or more yoke assemblies are adapted to be disposed side by side along the crank shaft and operatively coupled such that when one piston is at TDC, the adjacent piston is at BDC, and vice versa. The crank shaft 12 extending through the yokes may be divided into modular sections which are separable and of which a plurality may be connected to build up additional linear yoke assemblies and thereby the cylinder capacity of the engine as required.

In each embodiment described herein, the leverage means 14 is rotatable with the crank shaft 12 and configured such that at least one arced surface thereof contacts with an inner surface associated with the linear yoke structure 18 during rotation. This ensures total contact between the crank and the yoke at substantially all times throughout the combustion cycle, and creates the earlier described "cam effect".

It will become apparent that use of a cam follower member 22 provides a simplified means of modifying the assembly to suit different requirements/applications. Through use of the member 22 and an appropriately modified yoke structure 18 with which it makes contact, the assembly 10 can be configured for single or double dwell, so combustion efficiency can also be made optimal. The member is also easy to manufacture and is not complex in that it does not involve a large number of individual moving parts or heavy load supporting bearings.

The reference numerals used to indicate the assembly 10, the leverage means 14, yoke assembly 16, and the yoke structure 18 are distinguished between each of the three embodiments described herein using reference letters a, b, and c. For example, the assembly of the first embodiment is referenced 10a, while the leverage means of the second embodiment is referenced 14b, and so on. It should be noted that for simplicity, some components such as the actual cylinder chambers to which the respective pistons would extend and retract therein have been removed so that the important and inventive aspects of this invention can be discussed more clearly.

FIGS. 1-4 illustrate a first embodiment of the present invention being an assembly 10a configured for single dwell from 0 through 90 degree rotation of the crank shaft 12, the assembly including a leverage means 14a having two cam follower members 22 built onto the crank shaft 12 and interacting with the yoke structure 18a such that force is carried from the yoke to rotate the crank.

In particular, the leverage means 14a includes two parallel and laterally spaced cam follower members 22 including arced surfaces adapted to contact respective inner surfaces 24 of the yoke structure 18a, the surfaces 24 being inner surfaces of the yoke structure located at the "base" of the yoke assembly 16a, that is, on the opposite end of the piston 20. The leverage means 14a further includes a large diameter rolling element or bearing 26 extending between the two cam follower members and adapted to contact an arced inner surface 28 of the yoke structure. Disposed inside the larger diameter rolling element 26 is a smaller diameter bearing 30 through which the crank shaft 12 and a connecting pin 32 connecting the two cam follower members 22 extends. The skilled addressee would realise that when the crank shaft 12 rotates, the smaller diameter bearing 30 rotates, together with the crank shaft, inside the larger diameter rolling element 26, as do the two cam follower members 22 and the pin 32 connecting the two members.

Figure 4:
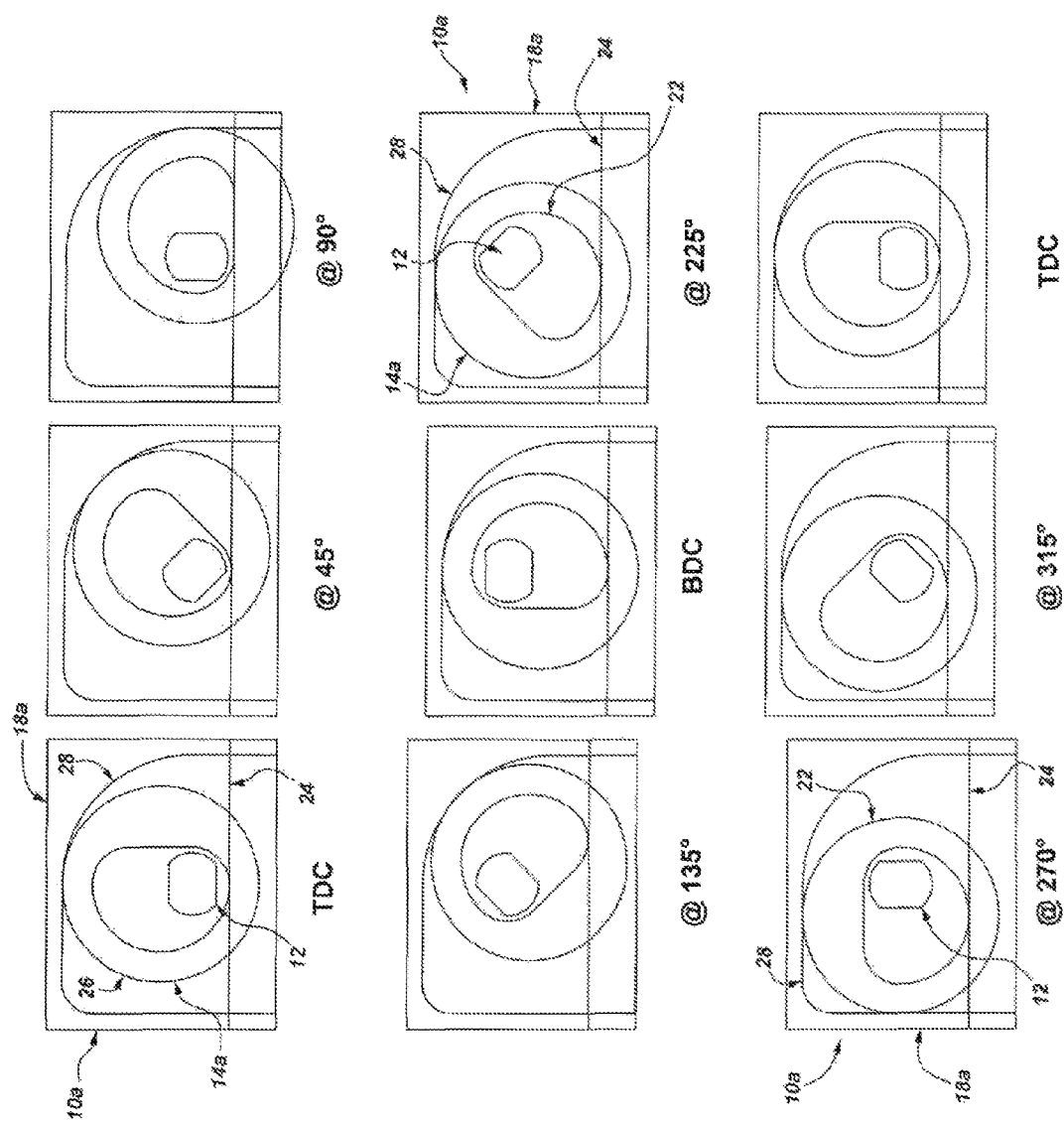
FIG. 4 illustrates a schematic representation of the relevant translation of movement between the crank assembly and the yoke structures shown in FIGS. 2-3, wherein the complete crank shaft rotation between 0° to 360° is acknowledged with respect to the translated yoke structure travel for that corresponding rotation.

FIG. 1 shows another still smaller diameter bearing journalled about the connecting pin 32, but which is not shown in FIGS. 2-4. For the purpose of keeping the three embodiments distinct from one another, this additional bearing while shown in FIG. 1 as an optional component will not be described until later in this specification with particular reference to the preferred desmodronic shaft embodiment depicted in FIGS. 8-10.

The arced inner surface 28 of the yoke structure is provided by a substantially J-shaped insert 34 whose curved edge forms an adjacent edge to the respective inner surfaces 24. The insert 34 is made preferably of spring steel for taking the stress off the larger bearing 26. The inner surfaces 24 are provided by linear rods 36 which form the "base" of the yoke structure.

The leverage means 14a, which includes the cam follower members 22 and rolling element 26, and the inner surfaces of the yoke structure 18a are configured to ensure that there is at least one piston dwell time for each rotation of the crank, and that there is a cam effect during at least a period of the rotation. This is achieved in the embodiment shown through use of a cam follower member 22 having a rigid structure including a centre line with three centre points 38, 40 and 42 disposed there along which each define the centre of radius of three arced outer surfaces of the member 22. This can perhaps best be seen in FIG. 5 which relates to the second embodiment of the invention but which is directly comparable to the cam follower member of this first embodiment.

The first centre point 38 is the centre of radius of a first arced surface 44 which forms a quarter circle at a base corner of the member 22. The second centre point 40 is the centre of radius of a second arced surface 46 which forms a second quarter circle at the opposed base corner of the member. The third centre point 42 is the centre of radius of a third arced surface 48 which forms a semi-circle and the complete upper portion of the member 22 above the centre line. The first and second surfaces 44 and 46 are quarter circles of equal radius, preferably half the radius of the semi-circle surface 48, and are preferably joined by a fourth linear outer surface 50.

It can be appreciated from a viewing of FIG. 4 that at all times throughout the rotation of the crank, a point along one of the three arc surfaces of each cam follower member 22, as well as a surface of the large diameter rolling element 26, is making contact with one of the inner surfaces of the yoke structure 18. In particular, the rolling element 26 contacts surface 28 of the J-shaped insert 34, while one of the three arced surfaces of each cam follower member 22 contacts surface 24 of the yoke structure rods 36. There are thus two contact points 38 at each "arc" of the leverage means. The yoke contact points shown in FIG. 1 correspond with a crank shaft rotation of 90°. In having a double contact, the assembly is far more robust and balanced than hitherto known assemblies of this kind and there is far less likelihood of vibration.

In this first embodiment, the inner surfaces of the yoke structure are configured for dwell between 0 and 90 degree crank rotation. During at least a period of this dwell time, the outer bearing 26 rolls on the J-shaped insert until the "cam effect" is established between the outer bearing 26 and J-shaped insert contact surface 28. The cam effect results in a constant contact force being applied from the yoke structure to the crank shaft through at least shaft rotation angles 90 through 180 degrees. One advantage of the present invention when used in a combustion engine environment is that the decrease in combustion pressure which occurs as the piston travels is counterbalanced by the increase in leverage.

The distance between the first and second centre points 38 and 40 of each cam follower member 22 defines the stroke length of the piston. The skilled addressee would thus realise the ease at which the assembly 10a of the present invention can be modified to suit different applications requiring different torque ranges. One only needs to increase the radius of each of the quarter circle surfaces 44 and 46, and then the radius of the semi-circle surface 48 to compensate for the increased length of the member, in order to increase the torque capacity. Because the distance between the centre points 38 and 40 remains the same, the stroke length remains the same, meaning that the assembly can be modified for different torque ranges without the need to modify the stroke and hence height of the engine or assembly.

Similarly, if one wished to adjust the stroke, the distance between centre points 38 and 40 can easily be adjusted. The skilled addressee would realise that any adjustment of the cam follower member would require comparable re-dimensioning of the yoke structure inner surface.

In summary, the assembly 10a provides for a single dwell of the pistons from 0 through 90 degree rotation of the crank shaft, and then the transfer of a constant contact force from the linear yoke structure to the leverage means without sliding, as per a conventional scotch yoke type arrangement, but rather in a rocking motion which as mentioned in the preamble can be considered analogous to the motion of a rocking horse "rocking" for example. It is this "cam effect" that allows a much greater torque range than any conventional or scotch yoke designed engine. The remainder of piston travel after 90 degrees comprises movement from top dead centre to bottom dead centre from 90 to 180 degrees, and from bottom dead centre back to top dead centre from 180 to 360 degrees.

The use of the leverage means, specifically the outer bearing 26 and its interaction with the yoke structure, provides advantages over the prior art including a reduction in the total number of parts, simplified manufacturing and assembly in that the leverage member is a single rigid member, and full adjustability in that slight variations in the design of the leverage means will result in a change in leverage and dwell times to meet the requirements of any application.

Figure 5:
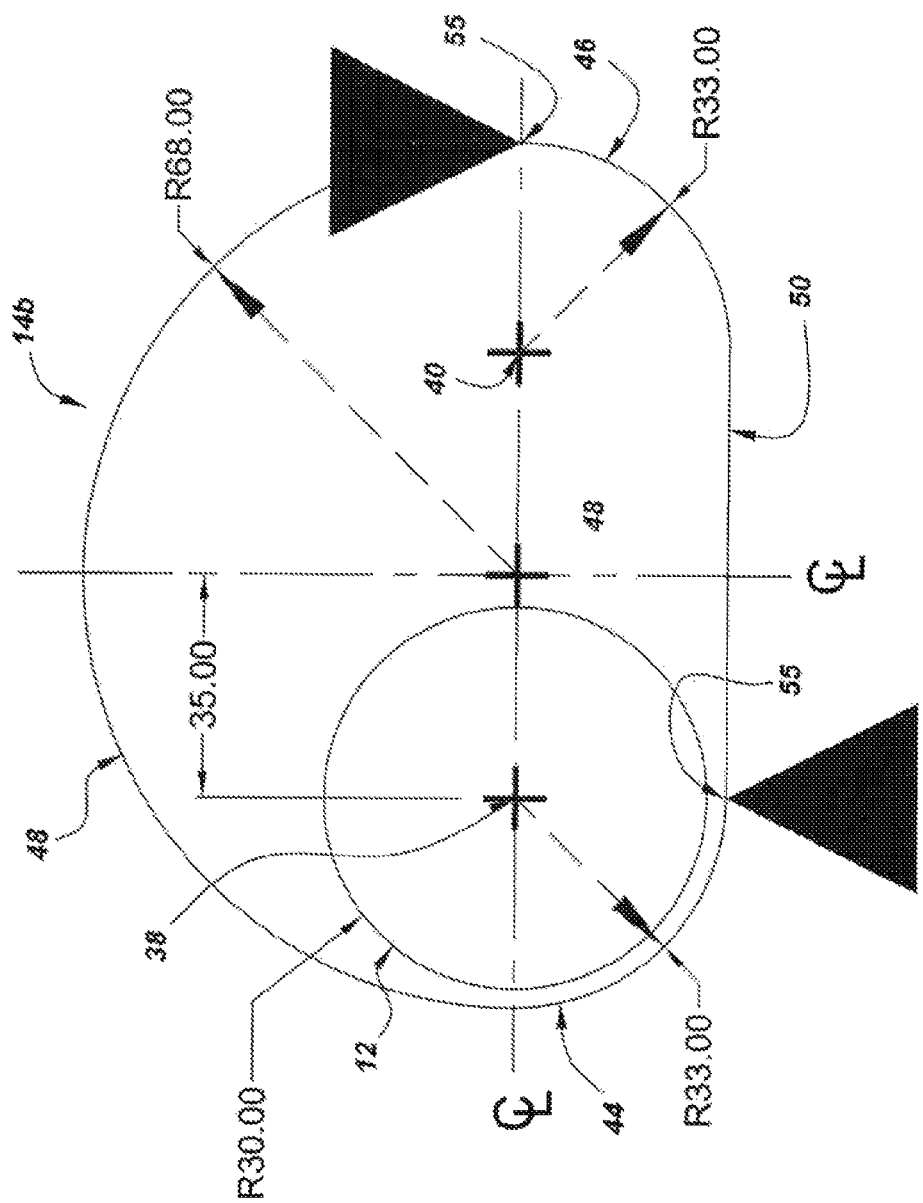
FIG. 5 illustrates an end profile view of a crank assembly including a leverage means built into the crank shaft in accordance with a second embodiment of the present invention.
Figure 6:
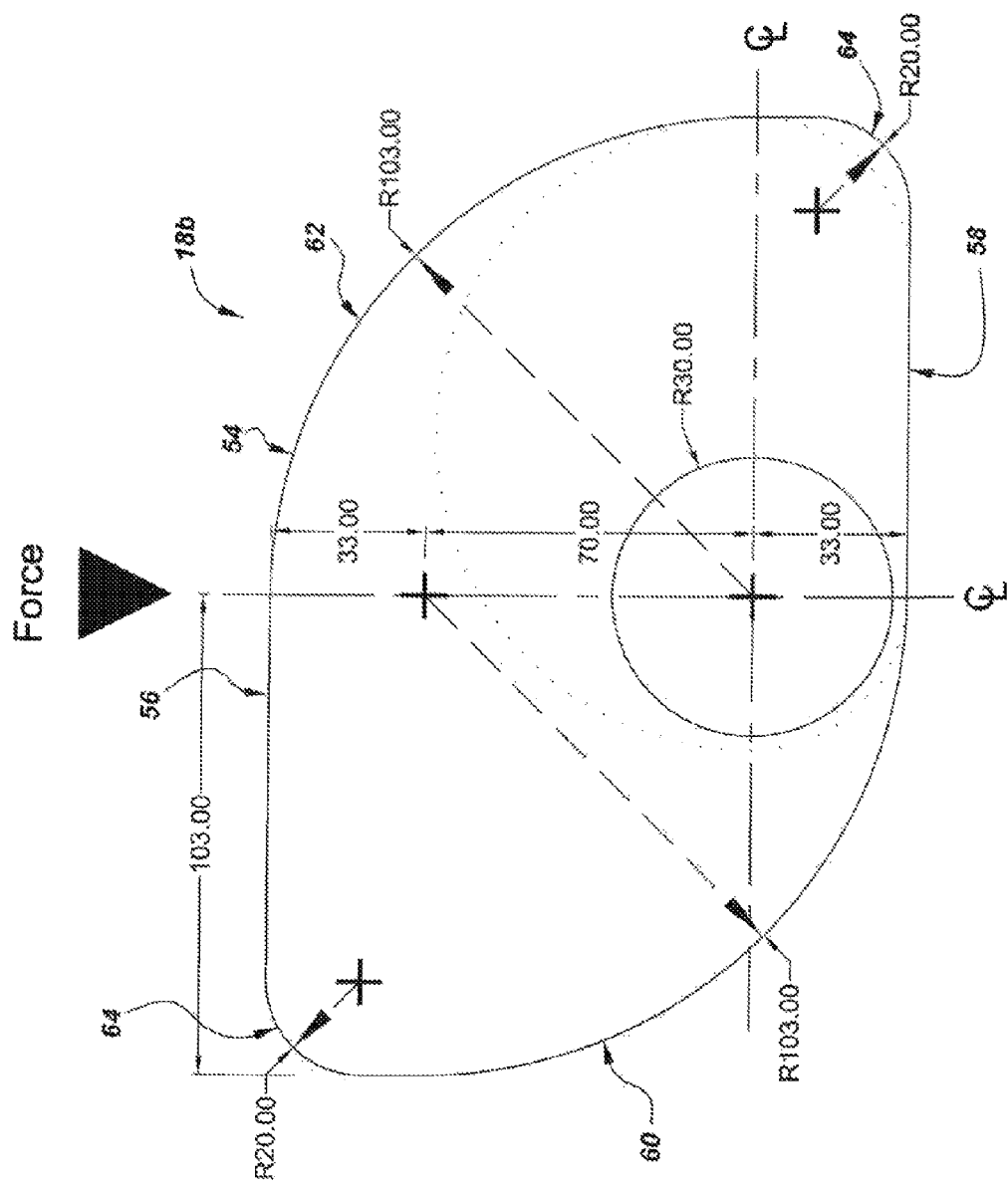
FIG. 6 illustrates an inner dimension of a yoke structure engageable by the leverage means of FIG. 5.
Figure 7:
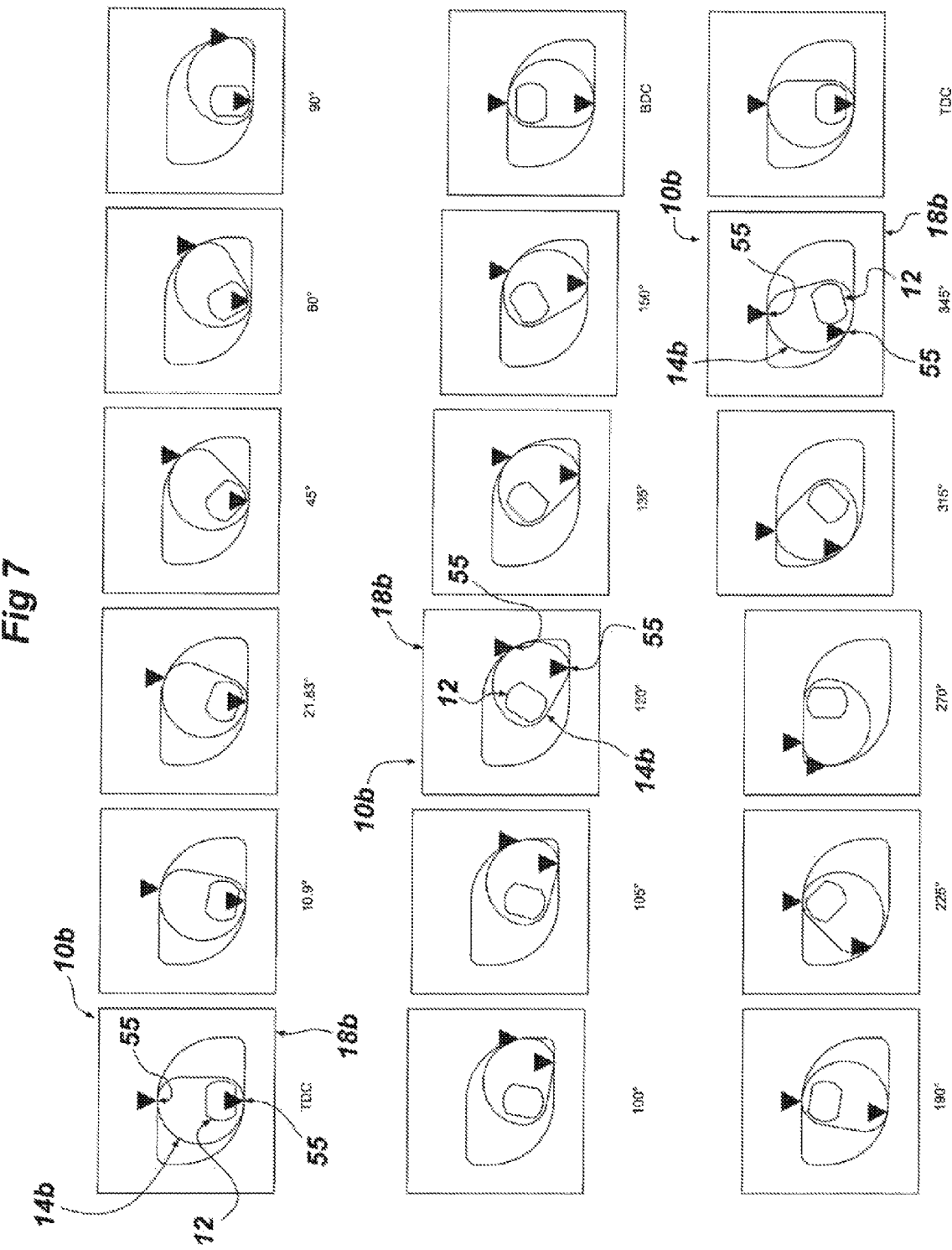
FIG. 7 illustrates a schematic representation of the relevant translation of movement between the crank assembly and leverage means of FIG. 5 and the yoke structure of FIG. 6 wherein the complete crank shaft rotation between 0° to 360° is acknowledged with respect to the translated yoke structure travel for that corresponding rotation.

FIGS. 5-6 illustrate a crank shaft 12 with a leverage means 14b including a cam follower member 22, and a yoke structure 18b configured in accordance with a second embodiment of the invention. The components are dimensioned such that the outer peripheral edge of the follower member 22, described earlier, contacts an inner peripheral edge 54 of the yoke structure 18b, as shown in FIG. 7, at all times throughout the combustion cycle. It is evident that the contact points 55 are at similar locations as contact points 38 of the first embodiment at a 90 degree crank angle.

The assembly 10b of this second embodiment provides for less components than the first embodiment in that the inner surface of the yoke structure 18b replaces the need for an external rolling element, with only one cam follower member 22 required to engage the inner surface. Furthermore, this configuration introduces a double dwell of the piston for each revolution of the crank as will be described in more detail below.

The inner peripheral edge 54 of the yoke is dimensioned to ensure that contact is maintained between one of surfaces 44 and 46 of the cam follower member 22 with the inner yoke edge 54, and in addition, surface 48 with edge 54. In the embodiment shown, the inner yoke edge 54 includes two parallel surfaces 56 and 58 that are spaced a distance which corresponds with the length of the cam follower member 22, as shown in the TDC position of FIG. 7, and two rounded edges 60 and 62 of equivalent radii measured from the crank shaft centre when positioned at 90° and 270° respectively. The additional rounded edges 64 shown are not essential but are dimensioned like so to simplify manufacture of the yokes. The cam follower member 22 works in the same manner as previously described with the "cam effect" being established at 90 degree rotation of the shaft, when arced surface 48 contacts the arced surface 62 of the yoke structure.

Some specific radii are provided in FIGS. 5 and 6, however, it is to be understood that the present invention is not intended to be limited to any particular cam follower or yoke inner edge radii. As described earlier, these dimensions are intended to be fully adjustable depending on the leverage and dwell configuration that is required to suit a particular application.

Therefore, while the piston 20 dwells again from 0 through 90 degree crank rotation, the remainder of travel is different to that of the first embodiment in that its travel after 90 degrees comprises movement from top dead centre to bottom dead centre from 90 to 180 degrees, a second dwell time from 180 through 270 degree crank rotation, and from bottom dead centre back to top dead centre from 270 to 360 degrees.

Figure 8:
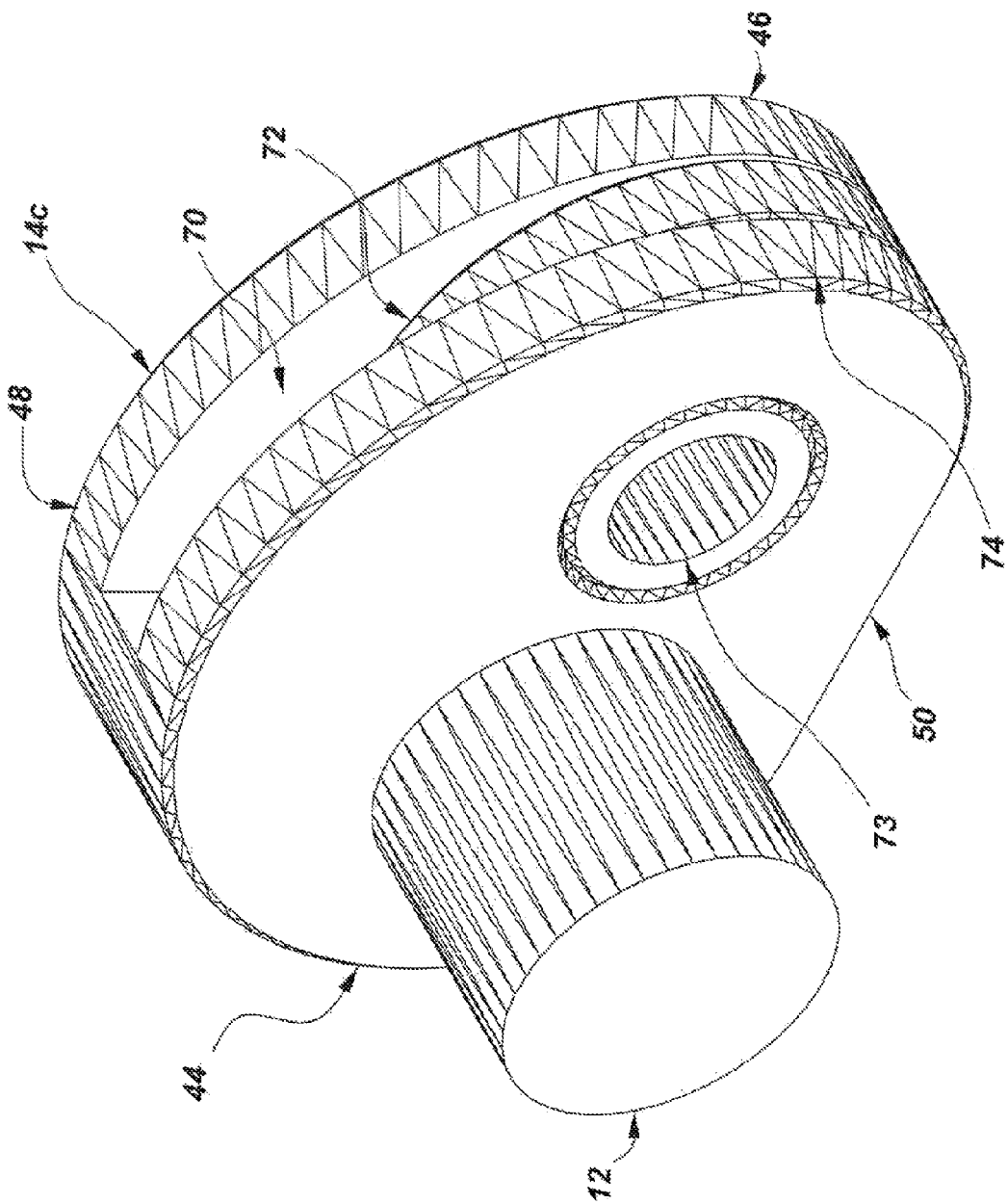
FIG. 8 illustrates a perspective view of a crank assembly including a leverage means utilising an internal rolling element in accordance with a third and preferred embodiment of the present invention.
Figure 9:
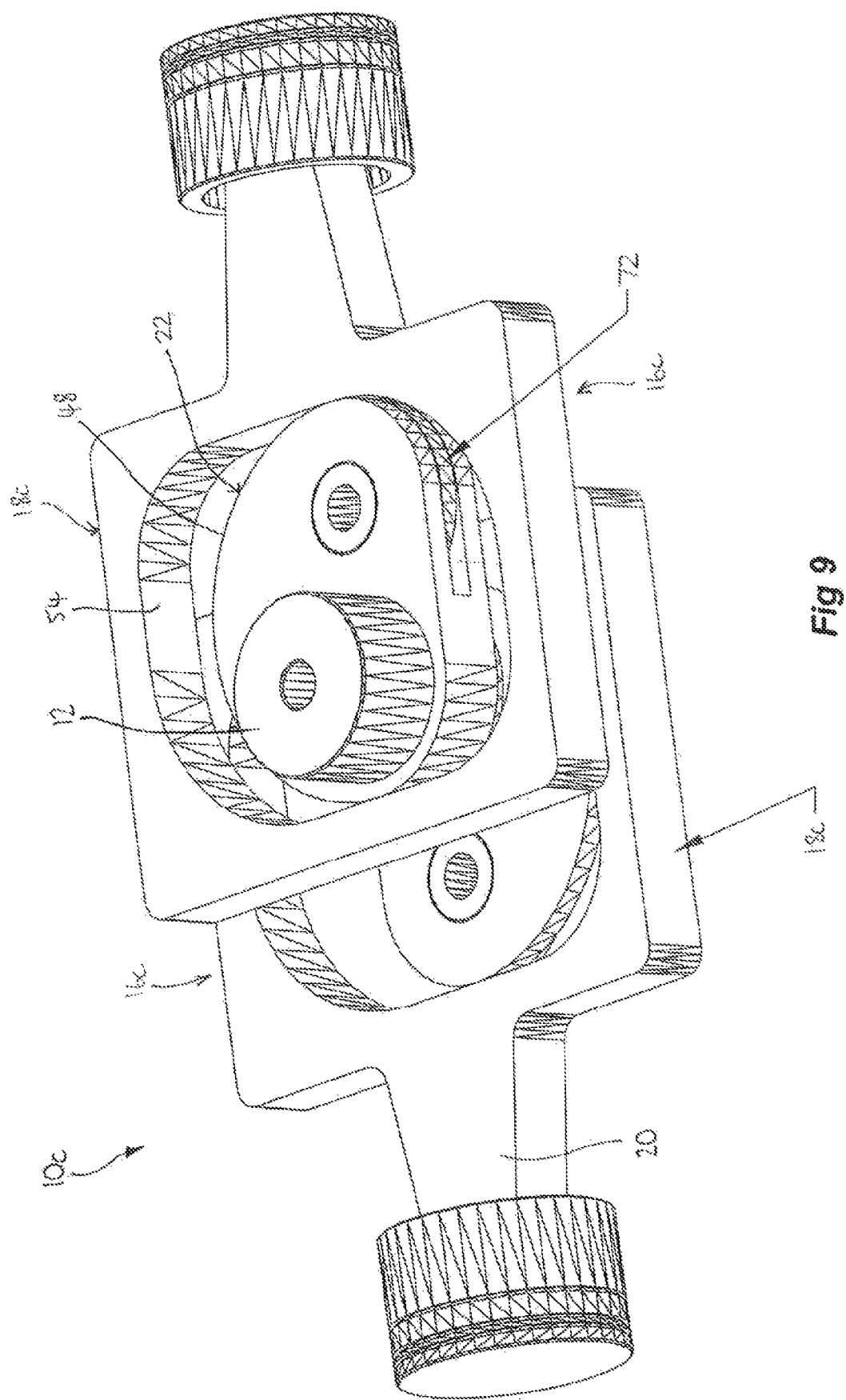
FIG. 9 illustrates a perspective view of a linear yoke assembly including a crank assembly with two leverage means of FIG. 8 and corresponding single piston yoke structures.

Turning now to FIG. 8 and a preferred form of the invention, there is shown a leverage means 14c forming part of the assembly 10c shown in FIG. 9, the leverage means 14c including a similar cam follower member and yoke structure profile as depicted in the second embodiment but including a hollowed out channel 70 between which is rotatably mounted an internal roller 72. The roller is rotatable about a pin 73. A shaft including a cam follower configured like so and including an internal roller 72 is herein referred to as a desmodronic crank shaft.

Figure 10:
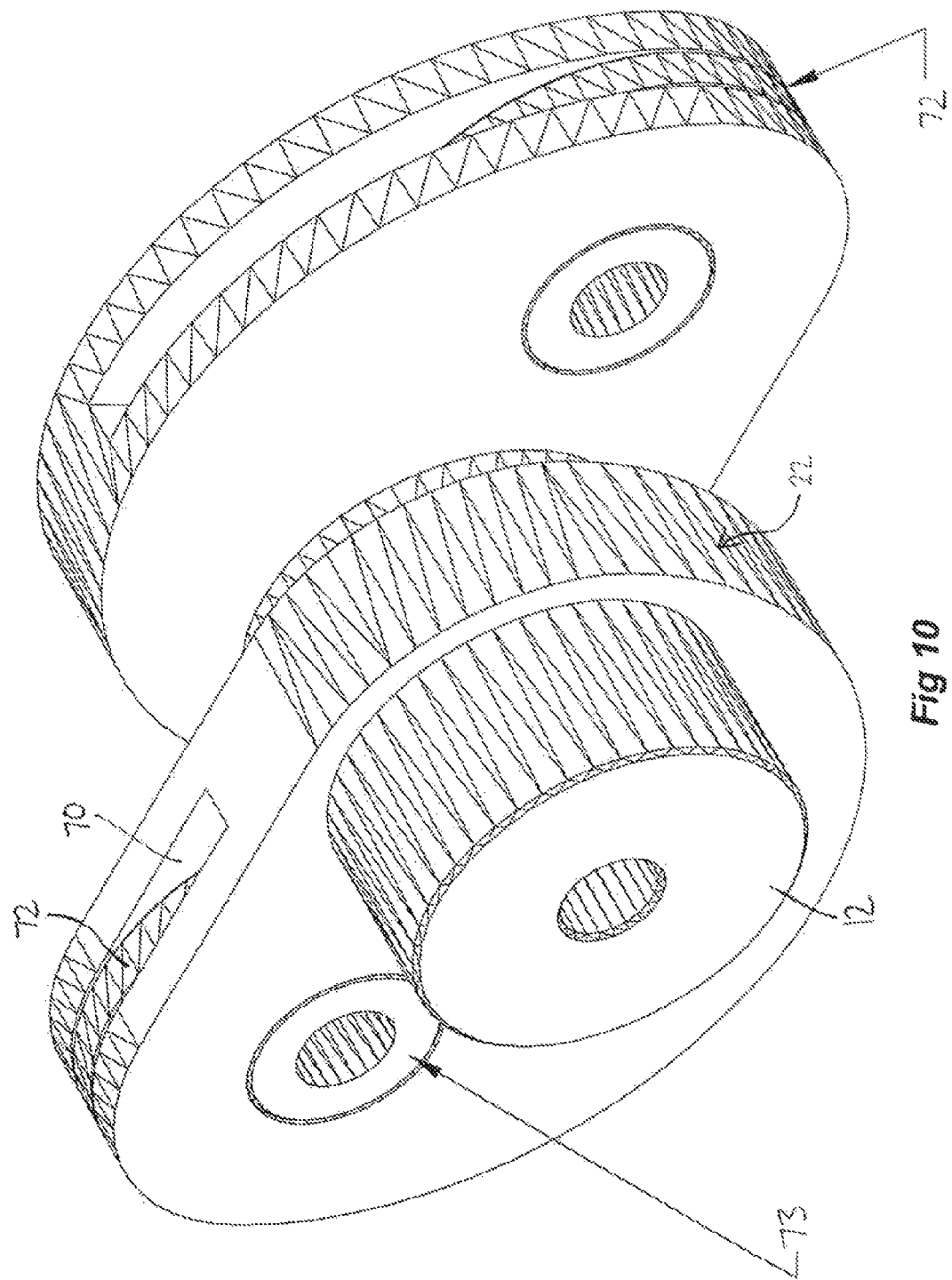
FIG. 10 illustrates an enlarged perspective view of the crank assembly and leverage means shown in FIGS. 8-9.

FIGS. 9-10 illustrate the leverage means 14c in use with a linear yoke assembly 16c and it should be appreciated that the yoke structure is essentially the same as that discussed with respect to the second embodiment but having an inner surface configured slightly differently. It is to be understood that the inner surface still includes the main rounded edges of the second embodiment 60 and 62, as well as parallel surfaces 56 and 58, but whose additional edges 64 are of different radii. This third embodiment thus provides an example of how the inner dimension of the yoke structure may be altered (for example, to simplify manufacture) without necessarily altering the working of the invention.

A further notable difference in this third embodiment is the sawn off portion 74 on the tip of the cam follower member at the junction between surfaces 46 and 48. The flat spot 74 allows for contact between the roller 70 and the inner peripheral edge 54 of the yoke at times when the tip of the member 14c, that is, the junction between surfaces 46 and 48, would otherwise have contacted the inner surface of the yoke, for example 90 through 180 degrees. The roller 70 thus serves to reduce friction and chatter between these surfaces at appropriate times throughout the 360 degree rotation of the crank.

In consideration of the drawings and above description, a person skilled in the art should appreciate how the assembly 10 of the invention works and provides various advantages over hitherto known assemblies which convert linear to rotary motion and vice versa. When applied to an internal combustion engine, where the linearly moveable member is a yoke piston structure and the rotatable shaft is a crank shaft, the skilled addressee would understand that, through using the assembly of the invention, each cylinder of the engine would have a piston in its uppermost position at the point of firing for a period of time rather than simply a point of time so that piston can remain at that uppermost position to ensure all the hydrocarbon fuel in the air/fuel intake is burnt rather than leaving any unburnt fuel to be exhausted. In a further form of the invention, the assembly can also be configured for double dwell where there is a second dwell time at the lowermost position of the piston.

Hence, as best seen in FIG. 7, while the crank shaft continues its rotation between 0°-90°, the piston itself has not moved from its uppermost position which means that as the piston is allowed to dwell in its uppermost position for a moment of time, despite the fact the crank shaft has continued its rotation, means that this additional time allows for the complete burning of the hydrocarbon fuel. Similarly, in the latter embodiments, while the crank shaft continues its rotation between 180°-270°, the piston has not moved from its lowermost position which means that more efficient exit of gases from the cylinder can take place. This is achieved by way of the mating profiles between the cam follower assembly and the yoke structure.

This ability to create a dwelling time for the piston is but one benefit of the present invention. The configuration of the cam follower member 22 and its interaction with the yoke structure 18 results in leverage being maximised, for dwell and leverage to be fully adjustable by simple adjustment of the dimensions of these components, and in a preferred form of the invention utilising a rolling element which reduces friction and chatter.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In the claims, except where the context requires otherwise due to express language or necessary implication, the word "comprising" is used in the sense of "including", i.e. the features specified may be associated with further features in various embodiments of the invention.

The invention claimed is:

1. An assembly for translating linear motion of a linearly moveable member between a top dead center and a bottom dead center position to rotary motion of a rotatable shaft that is rotatable about a first axis, said assembly characterized by:
a yoke structure associated with said linearly moveable member and moveable therewith, said yoke structure including at least one inner arced surface having a radius defined by a second axis that extends parallel to the first axis but is disposed therefrom; and leverage means associated and rotatable with the rotatable shaft about said first axis, whereby an outer peripheral edge of said leverage means includes at least one arced contact surface having a radius defined by a third axis extending parallel to each of said first and second axes, said leverage means including a centerline extending through each of said first and third axes;
wherein the leverage means and the yoke structure are dimensioned such that the inner arced surface of the yoke structure is encountered by the arced contact surface of the leverage means during a downstroke of the linearly moveable member from an approximate 90 degree shaft rotation angle;
wherein from the commencement of each shaft revolution to the approximate 90 degree shaft rotation angle, useful contact between the yoke structure and the leverage means resulting in energy transfer from the yoke structure to the rotatable shaft via the leverage means occurs at a first contact point along said leverage means arced contact surface which is disposed along said centerline; and
wherein useful contact between the respective arced surfaces from an approximate 90 degree shaft rotation angle occurs at a second contact point along said leverage means arced contact surface that is circumferentially disposed from said first contact point.

2. The assembly of claim 1 wherein the arced surface of the outer peripheral edge of the leverage means includes a semi-circular circumference, and the inner arced surface of the leverage means includes a quarter circle circumference, and said first and second axes are disposed such that contact therebetween occurs during said downstroke between 90 and 180 degree shaft rotation.

3. The assembly of claim 1 wherein from the commencement of each shaft revolution to the approximate 90 degree shaft rotation angle, contact between the leverage means and the yoke structure occurring at said first contact point causes a dwell of said linearly moveable member at top dead center.

4. The assembly of claim 1 wherein from the approximate 90 degree shaft rotation angle to 180 degrees shaft rotation, contact between the respective arced surfaces causes extending or retracting motion of the linearly moveable member to translate to rotational motion of the shaft.

5. The assembly of claim 1 wherein said leverage means includes a rolling element which includes said outer peripheral edge having at least one arced contact surface for engagement with said yoke structure inner arced surface, and a cam follower member including an outer peripheral edge adapted to contact a yoke structure linear surface to thereby provide the second contact point, said linear surface being disposed from said inner arced surface in a direction along said shaft such that said rolling element and said cam follower member are associated and rotatable with said shaft in a side by side arrangement.

6. The assembly of claim 5 wherein said yoke structure linear surface forms part of the yoke structure frame, and said inner arced surface is formed by a substantially J-shaped insert housed inside said frame.

7. The assembly of claim 1 wherein said leverage means is a cam follower member whose outer peripheral edge includes said at least one arced contact surface for engagement with said yoke structure inner arced surface.

8. The assembly of claim 7 wherein the arced surface of the outer peripheral edge of the leverage means includes at least a semi-circular circumference, and the inner arced surface of the leverage means includes at least a quarter circle circumference, and said first and second axes are disposed such that contact there between occurs during said downstroke between 90 and 180 degree shaft rotation.

9. The assembly of claim 8 wherein said first axis is disposed along a base centerline of said semicircular edge.

10. The assembly of claim 9 wherein said cam follower member includes at least a second arced contact surface and said yoke structure inner surface includes at least one linear surface, wherein said second arced contact surface is adapted to contact said linear surface to thereby provide at least the second contact point.

11. The assembly of claim 10 wherein said second arced contact surface is a quarter circle edge whose central axis is also disposed along said base centerline of said semicircular edge.

12. The assembly of claim 11 wherein said cam follower member includes at least a third arced contact surface in the form of a second quarter circle edge whose central axis is also disposed along said base centerline of said semicircular edge, wherein said first axis is disposed between the central axis of each quarter circle edge.

13. The assembly of claim 12 wherein said quarter circle edges are adjacent and flush with a linear edge extending between the quarter circle edges.

14. The assembly of claim 13 wherein each of said first and second quarter circle edges are adjacent and flush with said semi-circular edge, wherein at least a portion of the second quarter circle edge, the semi-circular edge at a portion adjacent the second quarter circle edge, or both, is sawn off to expose a rolling element housed substantially inside the cam follower member such that only a partial circumference of the rolling element extends out from the cam follower member footprint, a central axis of the rolling element being disposed along a base centerline of said semicircular edge.

15. The assembly of claim 14 wherein said rolling element makes contact with the inner yoke structure at least partially throughout 90 to 180 degree shaft rotation.

16. The assembly of claim 1 wherein said assembly is a double dwell assembly such that dwell at top dead center occurs between 0 and 90 degree shaft rotation, and 180 and 270 degree shaft rotation.

17. The assembly of claim 13 wherein the yoke structure inner surface is dimensioned such that from the commencement of each shaft revolution to the approximate 90 degree shaft rotation angle, contact between the leverage means and the yoke structure occurring at said first contact point causes a dwell of said linearly moveable member at top dead center, and from 180 to 270 degree shaft rotation angle, causes a dwell of said linearly moveable member at bottom dead center.

18. The assembly of claim 1 wherein said assembly is an internal combustion engine, and said linearly moveable member includes at least one piston, and said rotatable shaft is a crank shaft.

* * * * *